(12) United States Patent
Gao

(10) Patent No.: US 8,595,598 B2
(45) Date of Patent: Nov. 26, 2013

(54) HIGH-EFFICIENCY DYNAMIC TRANSMISSION THAT HAS A HIGH SPEED AND RELIABILITY

(75) Inventor: Zhi Gao, Shenzhen (CN)

(73) Assignee: STMicroelectronics (Shenzhen) R&D Co., Ltd., Shenzhen (CN)

( * ) Notice: Subject to any disclaimer, the term of this patent is extended or adjusted under 35 U.S.C. 154(b) by 552 days.

(21) Appl. No.: 12/798,767

(22) Filed: Apr. 9, 2010

(65) Prior Publication Data

US 2011/0145674 A1   Jun. 16, 2011

(30) Foreign Application Priority Data

Dec. 15, 2009 (CN) .......................... 2009 1 0259163

(51) Int. Cl.
*H03M 13/00* (2006.01)
*G06F 11/00* (2006.01)

(52) U.S. Cl.
USPC .......................... 714/774; 714/704; 714/776

(58) Field of Classification Search
USPC .......................... 714/758, 704, 774, 776, 802
See application file for complete search history.

(56) References Cited

U.S. PATENT DOCUMENTS

| | | | | |
|---|---|---|---|---|
| 5,025,485 A * | 6/1991 | Csongor et al. | ............. | 455/13.3 |
| 5,699,365 A * | 12/1997 | Klayman et al. | ............. | 714/708 |
| 5,923,274 A * | 7/1999 | Fischer | ........................... | 341/94 |
| 6,009,553 A * | 12/1999 | Martinez et al. | ............. | 714/784 |
| 6,182,264 B1 * | 1/2001 | Ott | ................... | 714/774 |
| 6,219,550 B1 * | 4/2001 | Kanerva et al. | .............. | 455/436 |
| 6,317,805 B1 * | 11/2001 | Chilton et al. | ................ | 714/800 |
| 6,606,722 B1 * | 8/2003 | Haimi-Cohen | ............... | 714/746 |
| 7,243,291 B1 * | 7/2007 | Williams | ...................... | 714/776 |
| 7,447,948 B2 * | 11/2008 | Galbi et al. | .................... | 714/701 |
| 2008/0016429 A1 * | 1/2008 | Saneshige et al. | ............ | 714/763 |
| 2009/0150748 A1 * | 6/2009 | Egner et al. | .................... | 714/758 |
| 2009/0207832 A1 * | 8/2009 | Senthilnathan et al. | ...... | 370/350 |
| 2009/0282305 A1 * | 11/2009 | Chen et al. | .................... | 714/718 |
| 2009/0319866 A1 * | 12/2009 | Antonakopoulos et al. | .. | 714/762 |

OTHER PUBLICATIONS

Carney, D.T.; Chandler, E.W.; , "Error correction coding for a serial digital multi-gigabit communication system," Electro/Information Technology Conference, 2004. EIT 2004. IEEE, vol., No., pp. 33-41, Aug. 26-27, 2004.*

P. Hurni, T. Braun, "Link-Quality Aware Run-Time Adaptive Forward Error Correction Strategies in Wireless Sensor Networks" Technischer Bericht IAM-11-003 vom Nov. 22, 2011.*

* cited by examiner

*Primary Examiner* — Cynthia Britt
(74) *Attorney, Agent, or Firm* — Munck Wilson Mandala, LLP

(57) ABSTRACT

A system and method for error correction coding is configured to dynamically implement one of a number of error correction coding methods during a transmission of data. The error correction coding method is selected based on a measured bit error rate during the transmission of data. The implementation of the error correction coding method is performed without interrupting the data transmission.

21 Claims, 3 Drawing Sheets

| INTERFERENCE LEVEL | CODING METHOD |
|---|---|
| $BER \leq 10^{-6}$ | NO CODING |
| $10^{-5} \geq BER > 10^{-6}$ | EVEN-CHECK CODING |
| $BER > 10^{-5}$ | CRC CODING |

300

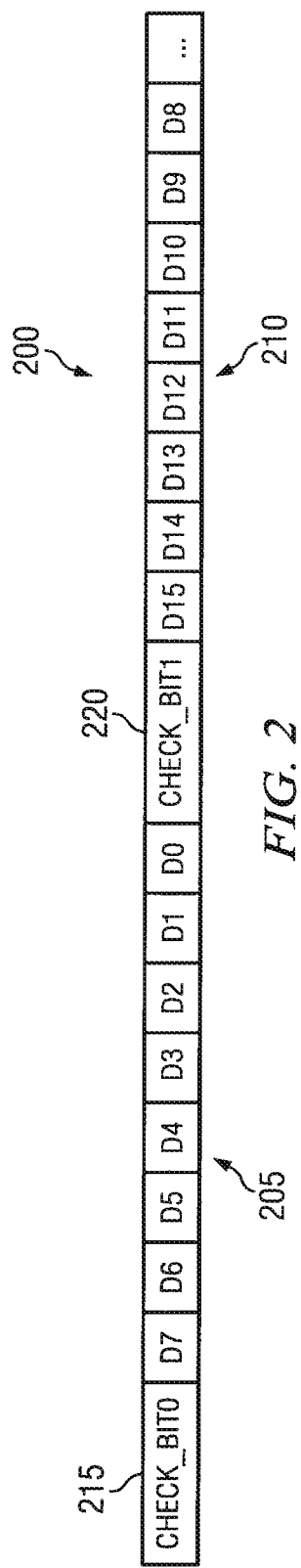
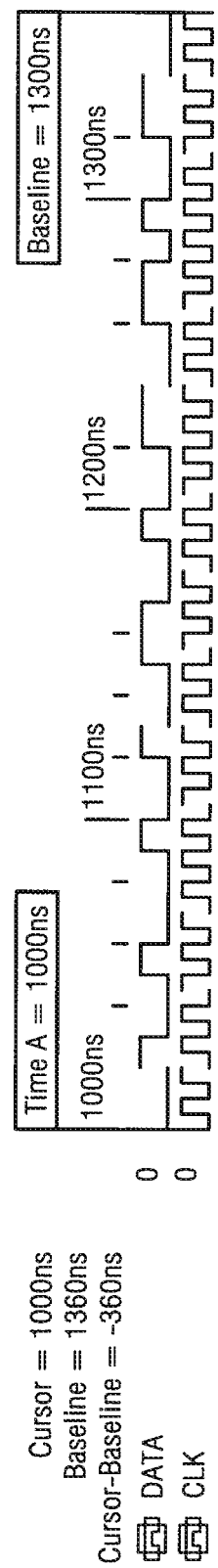
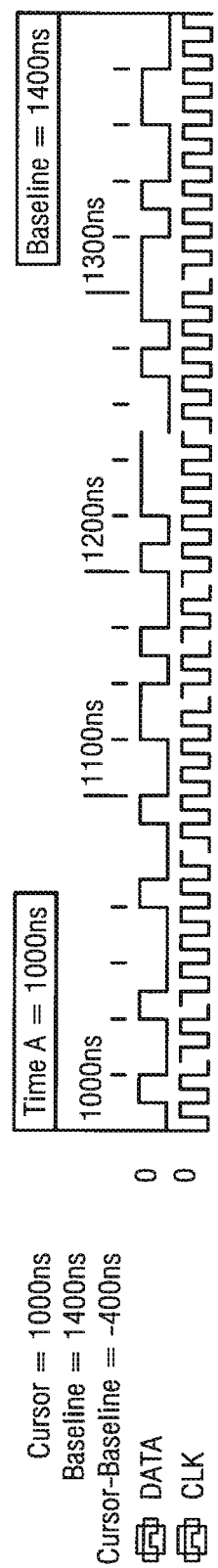
FIG. 2
FIG. 4B
FIG. 4C

| INTERFERENCE LEVEL | CODING METHOD |
|---|---|
| $BER \leq 10^{-6}$ | NO CODING |
| $10^{-5} \geq BER > 10^{-6}$ | EVEN-CHECK CODING |
| $BER > 10^{-5}$ | CRC CODING |

HIGH-EFFICIENCY DYNAMIC TRANSMISSION THAT HAS A HIGH SPEED AND RELIABILITY

CROSS-REFERENCE TO RELATED APPLICATION(S) AND CLAIM OF PRIORITY

The present application claims priority under 35 U.S.C. §119(a) to a Chinese patent application filed in the Chinese Intellectual Property Office on Dec. 15, 2009 and assigned Serial No. 200910259163.0, the entire disclosure of which is hereby incorporated by reference.

TECHNICAL FIELD

The disclosure relates generally to data transmission, and in particular to error correction of data transmissions.

BACKGROUND

In mathematics, computer science, telecommunication, and information theory, error detection and correction has great practical importance in maintaining data (e.g., information) integrity across noisy channels and less-than-reliable storage media.

SUMMARY

Embodiments of the present disclosure provide an device for transmitting data. The device includes a controller and a computer readable medium. The computer readable medium includes a plurality of instructions configured to cause a processor to determine an interference level on a transmission channel; select an error correction coding method corresponding to the interference level on the transmission channel; and implement the selected error correction coding method without interrupting the data transmission.

Embodiments of the present disclosure provide a system for data communications. The system includes a transmitter adapted to determine an interference level on a transmission channel. The transmitter is configured to implement an error correction coding based on the interference level.

Embodiments of the present disclosure provide a method for data communications. The method includes determining an interference level on a transmission channel. The method further includes selecting an error correction coding method based on the interference level and implementing the selected error correction coding method.

Other technical features may be readily apparent to one skilled in the art from the following figures, descriptions and claims.

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of this disclosure and its features, reference is now made to the following description, taken in conjunction with the accompanying drawings, in which:

FIG. 2 illustrates a transmission format according to embodiments of the present disclosure;

FIGS. 4B and 4C illustrate transmission formats according to embodiments of the present disclosure.

DETAILED DESCRIPTION

FIGS. 1A through 4C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless or wireline communication network.

Figure 1A:
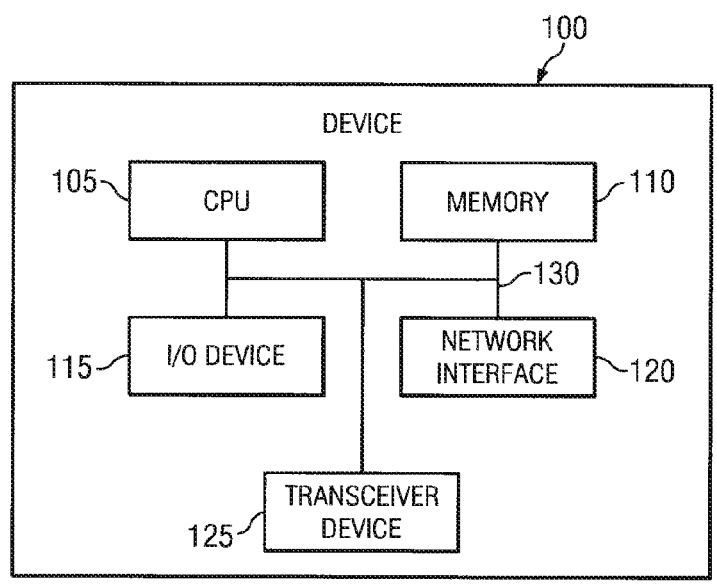
FIG. 1A illustrates a device that may be used to transmit data according to embodiments of the present disclosure.

FIG. 1A illustrates a device 100 that may be used to transmit data according to embodiments of the present disclosure. It would be understood that illustration of the device merely is exemplary and other devices can be utilized without departing from the scope of the present disclosure.

The device 100 may be a computer, personal digital assistant (PDA), cellular telephone, or any other device capable of transmitting, processing, and/or receiving signals via wireless and/or wireline communication links. The device 100 may include components such as a central processing unit ("CPU") 105 (e.g., a processor or special purpose controller), a memory unit 110, an input/output ("I/O") device 115, a network interface 120, and a transceiver device 125. The network interface 120 may be, for example, one or more network interface cards (NICs) that are each associated with a media access control (MAC) address. The components 105, 110, 115, 120 and 125 are interconnected by one or more communication links 130 (e.g., a bus). It is understood that the device 100 may be differently configured and that each of the listed components may actually represent several different components. For example, the CPU 105 may actually represent a multi-processor or a distributed processing system; the memory unit 110 may include different levels of cache memory, main memory, hard disks, and remote storage locations; and the I/O device 115 may include monitors, keyboards, and the like. The network interface 120 enables the device 100 to connect to a network. The transceiver device 125 can include a plurality of transmission antennas configured to transmit data via a wireless communication medium and a plurality of receiving antennas configured to receive data from a wireless communications medium. In some embodiments, the transceiver device 125 includes transmitters and/or receivers configured to communicate data via an infrared medium, wireless fidelity (wifi) medium, and an acoustic medium.

Figure 1B:
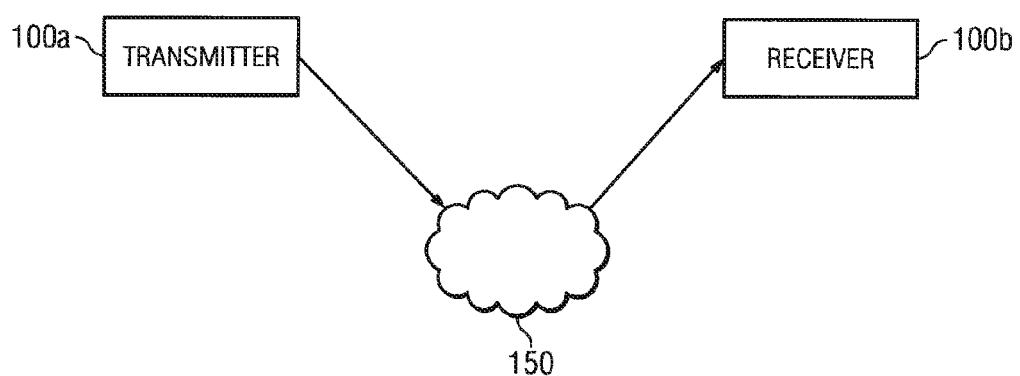
FIG. 1B illustrates a communication system according to embodiments of the present disclosure.

Referring now to FIG. 1B, a communications system according to embodiments of the present disclosure is illustrated. It would be understood that illustration of the communication system merely is exemplary and other communications systems can be utilized without departing from the scope of the present disclosure.

A first device 100a (e.g., a transmitter) transmits data to a second device 100b (e.g., a receiver). If there is noise in the communications channel 150, the data received by the second device 100b may be corrupted or unreadable. One measure of the level of erroneous bits in a transmission is the Bit Error Rate (BER). The BER is the ratio of the number of bits, elements, characters, or blocks incorrectly received to the total number of bits, elements, characters, or blocks sent during a specified time interval. Examples of the BER are (a) transmission BER, i.e., the number of erroneous bits received divided by the total number of bits transmitted; and (b) information BER, i.e., the number of erroneous decoded (corrected) bits divided by the total number of decoded (corrected) bits.

To ensure that the data is received and decoded properly, the first device 100a transmits the data with an error correction code. In one embodiment, referred to as Automatic Repeat Request (ARQ), the first device 100a sends the data and also an error detection code, which the second device 100b uses to check for errors, and requests retransmission of erroneous data. In many cases, the request is implicit; the receiver sends an Acknowledgement (ACK) of correctly received data, and the first device 100a re-sends anything not acknowledged within a reasonable period of time. In another embodiment, referred to as Forward Error Correction (FEC), the first device 100a transmitter encodes the data with an Error-Correcting Code (ECC) and sends the coded message. The second device 100b never sends any messages back to the first device 100a. The second device 100b decodes what it receives into the "most likely" data. The codes are designed so that it would take an "unreasonable" amount of noise to trick the second device 100b into misinterpreting the data. Additionally, or alternatively, the first device 100a transmits the data using both, e.g., a hybrid ARQ.

The data may be transmitted with a redundancy check. A redundancy check is extra data added to a message for the purpose of error detection. Error detection codes transmit more bits than were in the original data. Most codes are "systematic," e.g., the first device 100a sends a fixed number of original bits, followed by a fixed number of check bits (also referred to as redundancy bits) which are derived from the data bits by some deterministic process(es). The second device 100b applies the same process(es) to the received data bits and compares its output to the received check bits. If the values do not match, an error has occurred at the some point during the transmission. In a system that uses a "non-systematic" code, such as raptor codes, data bits are transformed into at least as many code bits, and the first device 100a sends only the code bits.

The first device 100a may transmit the data using a number of different error correction codes, such as, but not limited to, a repetition scheme, parity scheme (e.g., even-check or odd-check), checksum, Cyclic Redundancy Check (CRC), Hamming distance based checks, Hash function, horizontal and vertical redundancy check and polarity schemes.

FIG. 2 illustrates one embodiment of a transmission format 200 using an even-check coding method. It would be understood that illustration of the even-check coding merely is exemplary and other methods of coding, and no coding, can be utilized without departing from the scope of the present disclosure.

The data is transmitted from D0 through D15. Every frame of data, i.e., every eight bits of data 205 and 210, follows an even check bit 215 and 220 respectively. In one embodiment, check_bit0 215 is based on Equation (1) and check_bit1 220 is based on Equation (2).

$$\text{Check\_Bit0}=D7 \oplus D6 \oplus D5 \oplus D4 \oplus D3 \oplus D2 \oplus D1 \oplus D0 \quad \text{EQN (1)}$$

where "$\oplus$" denotes an Exclusive Or ("XOR") function.

$$\text{Check\_Bit1}=D15 \oplus D14 \oplus D13 \oplus D12 \oplus D11 \oplus D10 \oplus D9 \oplus D8 \quad \text{EQN (2)}$$

In such embodiment, the even-check bits, e.g., each of check_bit0 215 and check_bit1 220, occupies one eighth of the bandwidth of each frame of the data transmission. Accordingly, in a channel with little or no interference (e.g., noise), one ninth of each frame is wasted on error correction.

In one embodiment, the device 100 is configured to implement one of a number of error correction codes based on interference in the transmission channel. In such embodiment, the device 100 monitors the BER. The processor 105 in the device 100 is configured to implement one of several error correction codes, or no coding, based on the measured BER. Additionally or alternatively, the selection of method may be based on factors that indicate voltage or temperature.

Figures 3, 4A:
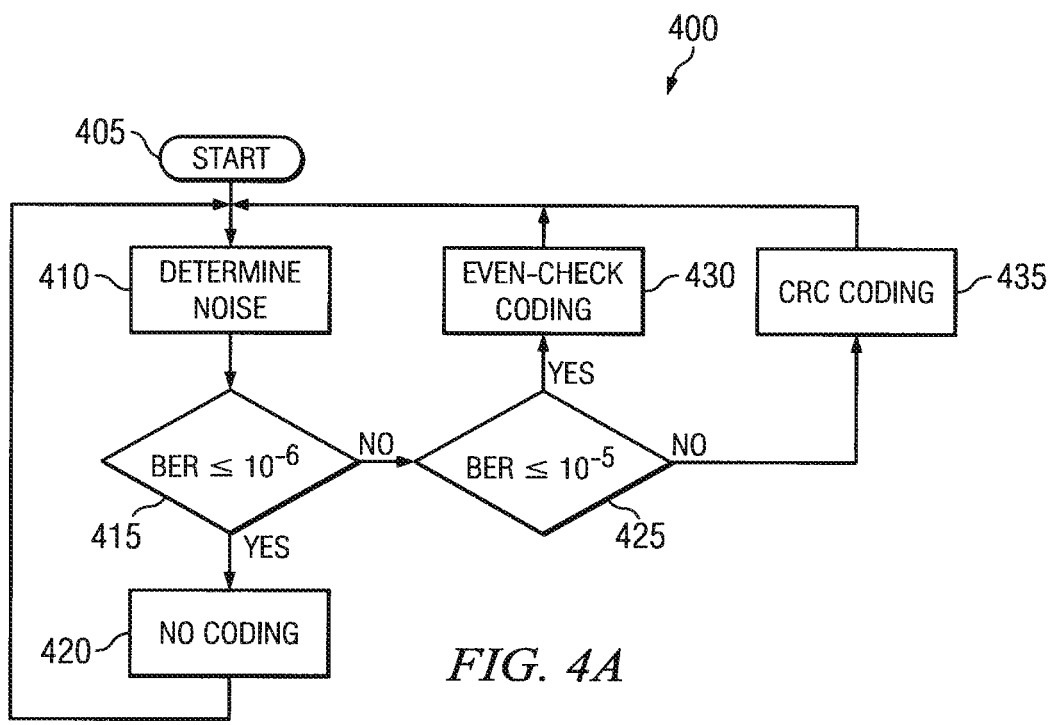
FIG. 3 illustrates a error correction code selection table according to embodiments of the present disclosure.
FIG. 4A illustrates a simple flow diagram for selecting error correction codes according to embodiments of the present disclosure.

Referring now to FIG. 3, an error correction code selection table 300 according to embodiments of the present disclosure is illustrated. It would be understood that illustration of the error correction code selection table 300 merely is exemplary and other error correction code tables can be utilized without departing from the scope of the present disclosure.

If the BER is less than or equal to $10^{-6}$ (BER$\leq 10^{-6}$), then the device 100 transmits the data with no error correction coding. If the BER is greater than $10^{-6}$ (BER$>10^{-6}$) but less than or equal to $10^{-5}$ (BER$\leq 10^{-5}$), then the device 100 transmits the data with even-check coding. If the BER is greater than $10^{-5}$ (BER$>10^{-5}$), then the device 100 transmits the data with a CRC method.

In the embodiment illustrated in FIG. 3, the implementations of the different error coding methods, or no coding, are performed in one transmission, e.g., without interrupting the transmission to implement a different error coding method by stopping or powering down. The implementation is dynamic. As such, the system is configured to transmit data with speed and reliability while maintaining high transmission efficiency. It will be understood that illustration of the error correction methods utilized is merely exemplary. Multiple error correction codes and multiple different BER levels (or other voltage or temperature), can be utilized without departing from the scope of the present disclosure.

FIG. 4 illustrates a simple flow diagram for selecting error correction codes according to embodiments of the present disclosure. It would be understood that illustration of the error correction code selection process 400 merely is exemplary and other error correction code selection processes 400 can be utilized without departing from the scope of the present disclosure.

The device 100 starts the process to transmit data in step 405. In step 410, the device 100 determines an interference level on the transmission channel 150. In one embodiment, the interference level (e.g., noise) on the transmission line may be determined by a BER for the transmission channel 150. In some embodiments, the device 100 makes an error code selection based on factors that indicate an interference based on the voltage or temperature on the transmission channel 150. For simplicity, BER will be utilized in this example. However, it would be understood that other factors can be utilized without departing from the scope of this disclosure.

If the BER is less than or equal to $10^{-6}$ in step 415, then the device transmits a byte of data with no coding in step 420. Thereafter, the process returns to step 410 wherein the device 100 continues to determine the interference level on the transmission channel 150.

If the BER is greater than $10^{-6}$ in step 415 and less than or equal to $10^{-5}$ in step 425, then the device 100 transmits the byte of data with an even-check coding method in step 430. Thereafter, the process returns to step 410 wherein the device 100 continues to determine the interference level on the transmission channel 150.

If the BER is greater than $10^{-5}$ in step 425, then the device 100 transmits the byte of data with a CRC coding method in step 435. Thereafter, the process returns to step 410 wherein the device 100 continues to determine the interference level on the transmission channel 150.

Referring now to FIGS. 4B and 4C, two transmission formats according to embodiments of the present disclosure are illustrated. In FIG. 4B, the device 100 transmits the data with an even-check coding. The data are coded according to the following:
001001000
100100110
010011001
101001100

In FIG. 4A, the device 100 determines that little or no interference exists in the transmission channel (e.g., BER≤$10^{-6}$). Therefore, the device 100 transmits the first byte of the data without coding (e.g., no coding). Thereafter, the device 100 determines that interference has increased on the transmission channel (e.g., $10^{-5}$ BER>$10^{-6}$). Therefore, the device 100 transmits the second byte of the data utilizing even-check coding. Thereafter, the device 100 determines that the interference levels are high (e.g., BER>$10^{-5}$). Therefore, the device 100 transmits the third byte of the data utilizing CRC coding. Thereafter, the device 100 determines the interference on the transmission channel reduces such that $10^{-5}$≥BER>$10^{-6}$. Therefore, the device 100 transmits the fourth byte utilizing even-check coding. The data are coded according to the following:
01001000
100100110
10010111001011
101001100

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device for transmitting data, the device comprising:
   a controller;
   a transmitter configured to transmit data on a transmission channel;
   a computer readable medium; and
   a plurality of instructions, wherein at least a portion of the plurality of instructions are storable in the computer readable medium, and further wherein the plurality of instructions are configured to cause a processor to:
      determine an interference level on the transmission channel,
      select one of a plurality of error correction coding methods corresponding to the interference level on the transmission channel, and
      implement the selected one of the plurality of error coding methods without interrupting a transmission of the data.

2. The device of claim 1, wherein the plurality of instructions are configured to cause the processor to determine a bit error rate.

3. The device of claim 2, wherein the selected error correction coding method comprises at least one of a first error coding method corresponding to a first bit error rate level and a second error coding method corresponding to a second bit error rate level.

4. The device of claim 3, wherein the first bit error rate level is less than or equal to $10^{-6}$ and the second bit error rate level is greater than $10^{-6}$.

5. The device of claim 1, wherein the selected error coding method comprises no error coding.

6. The device of claim 1, wherein the selected error coding method comprises an even-check coding method.

7. The device of claim 1, wherein the selected error coding method comprises a cyclic redundancy check coding method.

8. A system for data communications, the system comprising:
   a transmitter configured to:
      determine an interference level on a transmission channel;
      dynamically select one of a plurality of error correction coding methods based on the interference level;
      update the selection at an update rate fast enough to transmit a first byte of data encoded with a first method of encoding and to transmit a second byte of data encoded with a second method of encoding different from the first method of encoding; and
      employ the selected error correction coding for transmission of data on the transmission channel.

9. The system of claim 8, wherein the transmitter is configured to determine an interference level on a transmission channel based on one of a voltage and a temperature on the transmission channel.

10. The system of claim 9, wherein the transmitter is configured to determine an interference level on a transmission channel by determining a bit error rate, and to select at least one of a first error correction coding corresponding to a first bit error rate level and a second error correction coding corresponding to a second bit error rate level.

11. The system of claim 10, wherein the first bit error rate level is less than or equal to 10-6 and the second bit error rate level is greater than 10-6.

12. The system of claim 8, wherein the selected error correction coding comprises no error coding.

13. The system of claim 8, wherein the selected error correction coding comprises an even-check coding.

14. The system of claim 8, wherein the selected error correction coding comprises a cyclic redundancy check coding.

15. The system of claim 8, wherein the transmitter is configured to transmit data to a receiver that does not send any acknowledgement back to the transmitter.

16. A method for data communications, the method comprising:
   determining, by a transmitter, an interference level on a transmission channel;
   selecting, in the transmitter, one of a plurality of error correction coding methods corresponding to the interference level on the transmission channel; and
   implementing, with the transmitter, the selected one of the plurality of error coding methods without interrupting a transmission of data.

17. The method of claim 16, further comprising:
   determining a bit error rate.

18. The method of claim 17, further comprising:
   selecting at least one of first error coding method corresponding to a first bit error rate level and a second error coding method corresponding to a second bit error rate level.

19. The method of claim 16, wherein the selected error coding method comprises no error coding method.

20. The method of claim 16, wherein the selected error coding method comprises an even-check coding method.

21. The method of claim 16, wherein the selected error coding method comprises a cyclic redundancy check coding method.

* * * * *